United States Patent
Cariou et al.

(10) Patent No.: US 10,038,583 B2
(45) Date of Patent: Jul. 31, 2018

(54) METHOD AND DEVICES FOR TRANSMITTING AND RECEIVING MULTI-CARRIER SYMBOLS

(75) Inventors: Laurent Cariou, Rennes (FR); Philippe Christin, Rennes (FR); David Bernard, Marcille Raoul (FR)

(73) Assignee: ORANGE, Paris (FR)

(*) Notice: Subject to any disclaimer, the term of this patent is extended or adjusted under 35 U.S.C. 154(b) by 1231 days.

(21) Appl. No.: 13/377,321

(22) PCT Filed: Jun. 8, 2010

(86) PCT No.: PCT/FR2010/051135
§ 371 (c)(1),
(2), (4) Date: Dec. 9, 2011

(87) PCT Pub. No.: WO2010/142909
PCT Pub. Date: Dec. 16, 2010

(65) Prior Publication Data
US 2012/0099607 A1    Apr. 26, 2012

(30) Foreign Application Priority Data
Jun. 9, 2009  (FR) ...................................... 09 53810

(51) Int. Cl.
*H04L 27/26*    (2006.01)
(52) U.S. Cl.
CPC .................................. *H04L 27/261* (2013.01)
(58) Field of Classification Search
None
See application file for complete search history.

(56) References Cited

U.S. PATENT DOCUMENTS

| | | | |
|---|---|---|---|
| 6,456,611 B1 * | 9/2002 | Hu et al. ........................ | 370/342 |
| 6,654,613 B1 * | 11/2003 | Maeng et al. ................ | 455/522 |
| 7,069,033 B1 * | 6/2006 | Moon et al. .................. | 455/522 |
| 8,179,955 B2 * | 5/2012 | Taylor et al. ................. | 375/230 |
| 2002/0119781 A1 * | 8/2002 | Li et al. ........................ | 455/450 |
| 2002/0122383 A1 * | 9/2002 | Wu et al. ...................... | 370/210 |

(Continued)

FOREIGN PATENT DOCUMENTS

| | | |
|---|---|---|
| EP | 0734132 A2 | 3/1996 |
| EP | 0933904 A2 | 1/1999 |
| EP | 1780966 A1 | 5/2007 |

OTHER PUBLICATIONS

Jim Zyren, Overview of the 3GPP Long Term Evolution Physical Layer, Jul. 2007, 3GPPEVOLUTIONWP.*

(Continued)

*Primary Examiner* — Noel R Beharry
*Assistant Examiner* — Wilfred Thomas
(74) *Attorney, Agent, or Firm* — David D. Brush; Westman, Champlin & Koelher, P.A.

(57) ABSTRACT

A method and apparatus are provided for transmitting time/frequency frames. The method includes: framing and mapping data symbols as input to a multi-carrier multiplexer; transforming pilots with multiple-state data modulation known to a receiver of the frames, the pilot modulation state being selected as a function of data that is not known to the receiver and of coding rules that are known to the receiver; and inserting previously-transformed pilots in distributed manner into the mapped frame.

8 Claims, 5 Drawing Sheets

(56) References Cited

U.S. PATENT DOCUMENTS

| | | | |
|---|---|---|---|
| 2003/0072254 A1* | 4/2003 | Ma et al. ................. 370/208 |
| 2003/0142764 A1* | 7/2003 | Keevill et al. ............ 375/341 |
| 2003/0179783 A1* | 9/2003 | Uekama et al. ........... 370/535 |
| 2003/0193970 A1* | 10/2003 | Kim ................. H04L 27/2613 |
| | | | 370/509 |
| 2003/0203719 A1* | 10/2003 | Barrett ................. H04L 1/004 |
| | | | 455/67.11 |
| 2004/0146115 A1* | 7/2004 | Feng et al. ............... 375/260 |
| 2005/0068993 A1* | 3/2005 | Russell et al. ........... 370/537 |
| 2005/0220172 A1* | 10/2005 | Mo ................... H04B 1/7163 |
| | | | 375/130 |
| 2006/0045001 A1* | 3/2006 | Jalali ....................... 370/208 |
| 2006/0067411 A1* | 3/2006 | Sandhu ................... 375/260 |
| 2006/0159193 A1* | 7/2006 | Mattsson ............ H04L 1/0054 |
| | | | 375/265 |
| 2007/0183384 A1* | 8/2007 | Kwak et al. .............. 370/338 |
| 2007/0189240 A1* | 8/2007 | Cho .................... H04L 5/0051 |
| | | | 370/337 |
| 2007/0223602 A1* | 9/2007 | Yu et al. .................. 375/260 |
| 2008/0002782 A1* | 1/2008 | Niu et al. .................. 375/295 |
| 2008/0022181 A1* | 1/2008 | Belogolovy ......... H04L 1/0057 |
| | | | 714/751 |
| 2008/0151989 A1* | 6/2008 | Von Elbwart ....... H04L 25/0226 |
| | | | 375/239 |
| 2009/0290633 A1* | 11/2009 | Oh ........................ H04H 20/89 |
| | | | 375/240.01 |
| 2009/0323640 A1* | 12/2009 | Chakrabarti et al. ......... 370/335 |
| 2011/0122846 A1* | 5/2011 | Yu et al. .................. 370/335 |

OTHER PUBLICATIONS

International Preliminary Report on Patentability and English translation of the Written Opinion dated Dec. 12, 2011 for corresponding International Application No. PCT/FR2010/051135, filed Jun. 8, 2010.

International Search Report dated Sep. 2, 2010 for corresponding International Application No. PCT/FR2010/051135, filed Jun. 8, 2010.

* cited by examiner

METHOD AND DEVICES FOR TRANSMITTING AND RECEIVING MULTI-CARRIER SYMBOLS

CROSS-REFERENCE TO RELATED APPLICATIONS

This Application is a Section 371 National Stage Application of International Application No. PCT/FR2010/051135, filed Jun. 8, 2010, which is incorporated by reference in its entirety and published as WO 2010/142909 on Dec. 16, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telecommunications. Within this field, the disclosure relates more particularly to so-called "digital" communications. Digital communications include in particular wireless communications; they also include wired communications, for example. The communications transmission medium is commonly referred to as a propagation or transmission channel, originally with reference to a channel over the air, and by extension with reference to any channel.

The disclosure relates to transmission and reception techniques.

BACKGROUND OF THE DISCLOSURE

Figure 1:
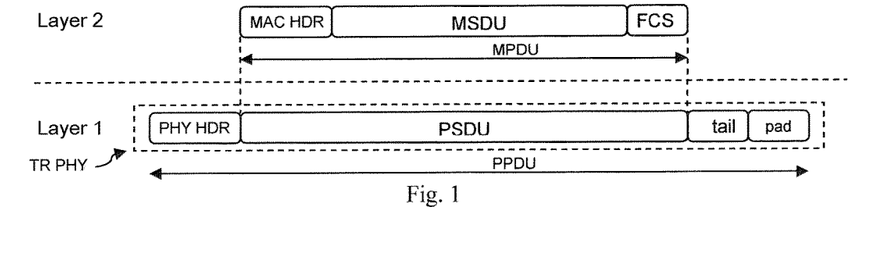
FIG. 1 is a diagrammatic representation of the structure of a frame of the level one physical layer and the corresponding frame of the level two MAC layer.
Figure 2:
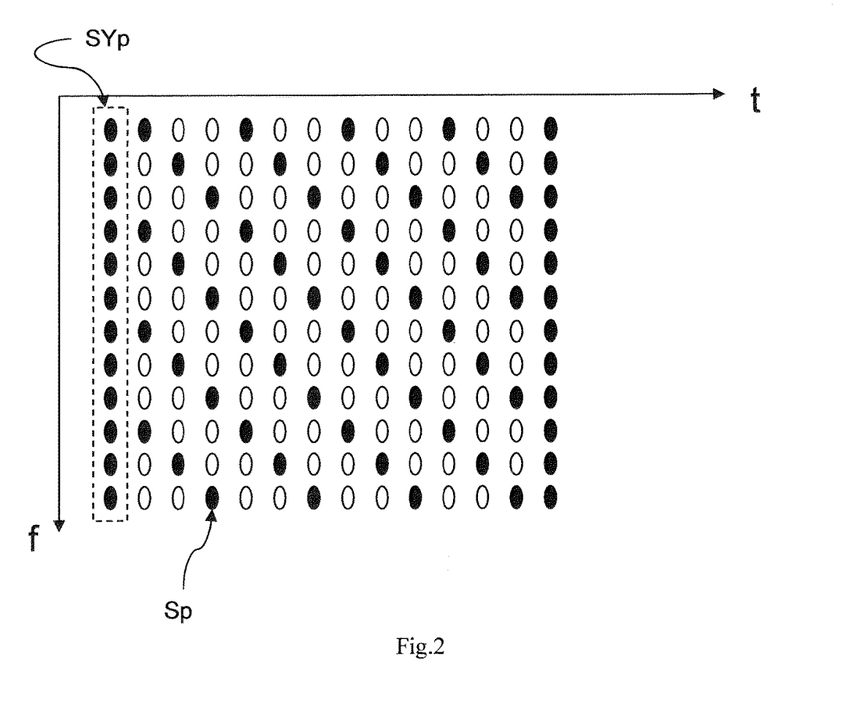
FIG. 2 is a diagrammatic representation of a typical OFDM time/frequency frame including an OFDM pilot symbol.
Figure 3A:
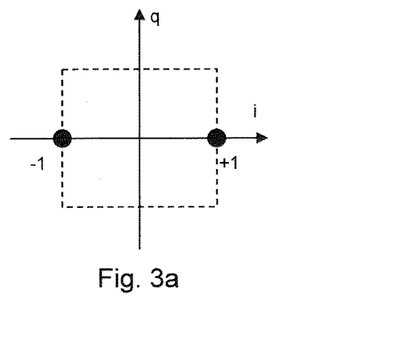
FIGS. 3a to 3d are Fresnel representations of constellations respectively associated with BPSK, QPSK, 16 QAM, and 64 QAM modulation.
Figure 3B:
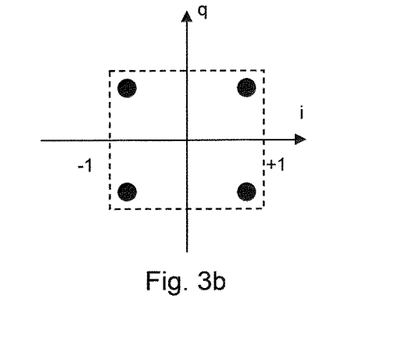
Figure 3C:
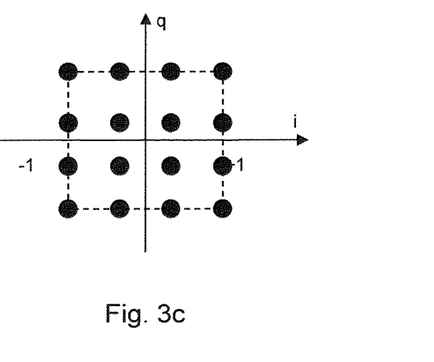
Figure 3D:
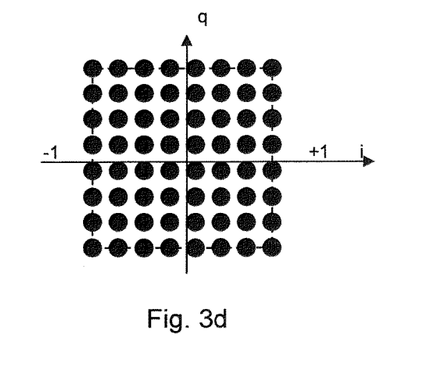

Multi-carrier digital communications systems such as orthogonal frequency division multiplexing (OFDM) radio-communications systems implement a physical frame TR PHY, as shown in FIG. 1, in the layer known as the physical layer with reference to the layer subdivisions of the open systems interconnection (OSI) model. The content of a frame is constituted in part by payload data i.e. associated with the binary data coding the information in a signal input to the multi-carrier transmitter device. At the output from the same device, the frame is said to be a time/frequency frame since it defines in time the locations on different carriers both of payload data symbols and of pilot symbols. FIG. 2 illustrates an OFDM type frame with payload data symbols in white and pilot symbols Sp in black.

Conventional multi-carrier transmission methods include a step of transforming binary data to be put into the form of data symbols taken from a data constellation by using multiple-state modulation, e.g. two states for binary phase shift keying (BPSK), four states for quadrature phase shift keying (QPSK), 16 states for 16-state quadrature amplitude modulation (16 QAM), or 64 states for 64 QAM. Constellations are conventionally represented on a plane having two axes (i, q) using a Fresnel representation, with the above-mentioned examples of BPSK, QPSK, 16 QAM, and 64 QAM modulation being shown respectively in FIGS. 3a to 3d. The axis, i, is associated with the real portion of the data symbols and the axis, q, with the imaginary portion of the data symbols.

When the transmitted data is conveyed by a transmission channel having characteristics that can vary in time and in space, it is essential for the receiver to estimate the channel in order to be able to equalize the received signal and detect the bits that were transmitted. In addition, the frequency reference of the receiver, as conventionally obtained by using a local oscillator, is generally independent of the frequency reference of the transmitter. Although it is generally possible to lock oscillators in frequency very accurately, environmental conditions (temperature, . . . ) may cause such oscillators to drift over time, and may give rise to a frequency offset that varies over time between the oscillators. Other sources of noise on reception, in particular those involving thermal noise, also have an impact on phase shifting. The pilots inserted on transmission into the frame have the function of enabling the receiver to estimate the transmission channel and to estimate the phase shift in order to compensate for its effects on the transmitted data. In order to limit the impact of the channel and of noise on pilots, pilots are transformed using a modulation function that is robust, conventionally BPSK. In addition, in order to limit the impact of the pilots on the peak-to-average power ratio (PAPR) the modulation function generally modulates a pseudo-random sequence. Under such circumstances, the value of a pilot (+1 or −1 for BPSK) is directly a function of the pseudo-random sequence; knowledge of the modulation function and of the pseudo-random sequence (or of the generator of said sequence) then enables the value of the pilot to be determined. In order to make use of pilots, the receiver knows their locations within the frame and also their values: the receiver knows the modulation function used on transmission and it uses the same pseudo-random generator as that used on transmission. It thus suffices for the receiver to compare the pilot as received with the expected value (+1 or −1 for BPSK) in the expected position in the frame in order to determine the amplitude variation and the phase rotation. In the physical layer, the frame TR PHY includes a header PHY HDR that precedes the data field PSDU (for physical layer service data unit). Very often the header includes an OFDM pilot symbol SYp that enables a first estimate to be made of the channel for all of the carriers. The OFDM symbols of the field PSDU then need to contain only a small number of pilots Sp, which pilots are distributed over a few carriers.

In order to satisfy ever-present requirements for increasing transmission rate, communications systems adjust transmission parameters, and more particularly the type of modulation. Thus, increasing data rate requires an increase in the number of modulation states. However, the greater the number of states, the greater the sensitivity of the transmitted data to noise and to channel variations. The transmitted data can then become too noisy and it will need to be transmitted again, thereby reducing the overall transmission rate. Other solutions must consequently be used, possibly in association, in order to increase the transmission rate.

SUMMARY

An exemplary embodiment of the invention proposes a transmission technique and a reception technique for use with a multi-carrier signal of the OFDM type, making it possible to improve the transmission capacity of a multi-carrier system.

Thus, an embodiment of the invention provides a method of transmitting time/frequency frames, the method comprising:

a step of framing and mapping data symbols to the input of a multi-carrier multiplexer;

a step of transforming pilots using multiple-state data modulation that is known to a receiver of the frames, the modulation state of the pilots being selected as a function of data that is not known to the receiver and of coding rules that are known to the receiver; and a step of inserting previously-transformed pilots in distributed manner into the mapped frame.

An embodiment of the invention provides a multi-carrier transmitter of time/frequency frames that include both data and pilots, the transmitter being adapted to implement a transmission method of the invention.

Thus, a transmitter of an embodiment of the invention comprises:

a multi-carrier multiplexer module generating multi-carrier symbols; and a pilot modulator module for modulating pilots with multiple-state data modulation known to a receiver of the frames, and for inserting the pilots as inputs to the multi-carrier multiplexer module;

the pilot modulator module being adapted to modulate at least some of the pilots distributed in the frame with states selected as a function of data that is not known to the receiver and of coding rules that are known to the receiver.

The method and the transmitter in accordance with an embodiment of the invention solve the problem as posed. The choice of modulation state as a function of data and of coding rules makes it possible to use the distributed pilots to convey data. Thus, by using the distributed pilots to code data, a method of an embodiment of the invention makes it possible to improve the data rate by increasing capacity.

For example, when the modulation used for transmitting the pilots is BPSK, the transmitter can select between two possible positions for each transmitted pilot: (+1,0) and (−1,0). Those two possible positions thus enable the transmitter to code two states, i.e. the equivalent of one bit. The coding rules make the link between the states and the data to be coded. For example, the rules may be to code a one bit with the modulation state (+1,0) and a zero bit with the modulation state (−1,0). When the modulation is QPSK, then the transmitter can select between four possible positions for each transmitted pilot: (+1,0), (0,1), (−1,0), and (0,−1). These four possible positions thus enable the transmitter to code four states, i.e. the equivalent of two bits. When the modulation is 16 QAM, the transmitter can select between sixteen possible positions for each transmitted pilot. The sixteen possible positions enable the transmitter to code sixteen states, i.e. the equivalent of four bits. When the modulation is 64 QAM, the transmitter can select between sixty-four possible positions for each transmitted pilot. The sixty-four possible positions enable the transmitter to code sixty-four states, i.e. the equivalent of six bits. Coding pilots in accordance with an embodiment of the invention enables the transmission data rate to be increased by a number of bits that is a function of the modulation used for modulating the pilots, for example one bit for BPSK and six bits for 64 QAM.

In a conventional OFDM frame, there commonly exists a pilot OFDM symbol that enables a first estimate to be made of the transmission channel.

This OFDM symbol is not used for coding information in accordance with an embodiment of the invention. Only the pilots that are distributed within the frame are used. In a particular embodiment of the invention, only some of the distributed pilots are used for coding data that is not known to the receiver.

In a particular implementation, the transmission method is such that at least some of the data not known to the receiver corresponds to coding information for detecting or for correcting transmission errors.

This implementation is particularly advantageous since it makes it possible to detect an error in the transmitted binary data along way upstream in the reception process. In known techniques, it is possible to detect a transmission error on the transmitted frame TR PHY, and consequently use a return channel to request the transmitter to transmit the erroneous frame again only by means of the frame checksum (FCS) field in the medium access control (MAC) frame. In those techniques, transmission error detection is managed in the MAC layer that forms part of the level two layer: the receiver must have received and decoded the entire MAC frame in order to be capable of detecting a transmission error and of determining whether the received physical frame TR PHY needs to be discarded because of the detected error. Unlike the techniques commonly employed by the person skilled in the art, a method of an embodiment of the invention enables a transmission error to be detected very early on in the reception process, since the error can be detected by decoding the information conveyed by the pilots, thus at binary level, i.e. at the level of the physical layer that forms part of the level one layer. Typically, when using BPSK modulation for the pilots, the coded error information may be parity information. When the modulation is more complex, the error coding may also be more complex, since the number of states available for coding information is greater. Depending on the implementation, it is possible for only some of the pilots to be used for coding error coding information. The way the pilots are distributed in the binary frame determines the maximum recurrence of the transmission error coding within a frame. As a function of the implementation, the coding may also enable the detected error to be corrected.

In a particular implementation, a transmission method is such that at least some of the data not known to the receiver corresponds to data making it possible to improve the quality of service of the streams exchanged between the transmitter and the receiver and/or between the receiver and the transmitter.

This implementation is particularly advantageous when a frame conveys data about the quantity of information (buffer size) remaining to be transmitted and about the priority of that information. The receiver can then put mechanisms into place for the purpose of complying with quality of service constraints on those information packets that remain to be transmitted (e.g.: calculating transmission opportunity (TXOP) on up and down channels (in an 802.11x system), a scheduling mechanism, optimizing packet queuing management).

An embodiment of the invention also provides a method of receiving time/frequency frames including both data and pilots, at least some of the distributed pilots coding data not known on reception, the method comprising the following steps:

of comparing the position in the i,q space of a received distributed pilot with the possible positions for pilots in order to deduce therefrom the position of the distributed pilot as transmitted, knowing the modulation used on transmission;

and on the basis of the position of the transmitted distributed pilot, determining the data coded by said pilot, knowing the coding rule used on transmission.

An embodiment of the invention also provides a receiver for receiving time/frequency frames including both data and pilots, pilots distributed in the frame coding data that is not known to the receiver, and the receiver being adapted to implement a reception method of an embodiment of the invention.

Thus, the receiver of an embodiment of the invention comprises:

a comparator adapted to compare the position in i,q space of a received distributed pilot with the possible pilot positions in order to deduce therefrom the position of the transmitted distributed pilot, knowing the modulation used on transmission, and in order to determine the data coded by said pilot from the position of the transmitted distributed pilot, knowing the coding rule used on transmission.

Knowing the modulation used on transmission for the pilots, the method determines all of the possible positions in the constellation in (i,q) space that can be occupied by pilots. The method compares the received distributed pilot with the various possible positions. The possible position closest to the position of the received distributed pilot corresponds to the position of the transmitted distributed pilot. Determining the position of the transmitted distributed pilot makes it possible to deduce therefrom the value of the data coded by said pilot, given knowledge of the coding rules used in transmission. For example, when the modulation used on transmission for the pilot is BPSK, the transmitter can select between two possible positions for each transmitted pilot: (+1,0) and (−1,0). The coding rule may consist in coding the value one by selecting the pilot (+1,0) and the value zero by selecting the pilot (−1,0). If the position (+1,0) is the closest to the position of the received pilot, then the method deduces therefrom and from its knowledge of the coding rule that the coded data is one. If the position (−1,0) is the closest to the position of the received pilot, then the method deduces therefrom and from its knowledge of the coding rule that the coded data is zero.

In a particular implementation, a reception method is such that the comparison step uses decision zones around each possible pilot position.

Using decision zones around the possible positions for the pilots makes it possible advantageously to take account of the level of noise and to transmit a return message to the transmitter when the received position of a pilot does not belong to any decision region. The return message may cause the transmitter to change its type of modulation for the pilots and select modulation that is more robust in order to protect the pilots more effectively from noise.

In a particular implementation, a reception method is such that:

the data coded by the transmitted pilots conveys transmission error coding information; and when the coded data associated with a distributed pilot codes an error, then the receiver generates a frame error message.

This implementation is particularly advantageous since it makes it possible to detect an error in the transmitted binary data very early on in the reception process. In known techniques, only the FCS field of the MAC frame enables the receiver to detect a transmission error in the transmitted frame TR PHY and to request the transmitter, over a return channel, to transmit the erroneous frame again. Using those techniques, transmission error detection is managed in the MAC layer that forms part of the level two layer: the receiver must have received and decoded the entire MAC frame in order to be capable of detecting a transmission error and of determining whether the received frame needs to be rejected as a result of the detected error. Unlike the techniques commonly employed by the person skilled in the art, a method of an embodiment of the invention enables a transmission error to be detected very early in the reception process, since the error can be detected by decoding the information conveyed by the distributed pilots, thus at binary level, i.e. at the level of the physical layer that forms part of the level one layer. The receiver has no need to wait until it has decoded the entire MAC frame before being able to generate a return message for informing the transmitter that the frame is erroneous and optionally requesting it to send the frame again. Typically, when BPSK modulation is used for the pilots, the coded information may be parity information. When the modulation is more complex, the error coding may also be more complex, since the number of available states for coding the information is greater. The distribution of pilots in the binary frame determines the maximum recurrence of the transmission error coding within a frame.

The various above implementations may optionally be combined with one or more other implementations in order to define a further implementation.

An embodiment of the invention also provides a telecommunications system adapted to implement a method of an embodiment of the invention.

Thus, a telecommunications system of an embodiment of the invention comprises a transmitter or a receiver of an embodiment of the invention.

An embodiment of the invention also provides a multiple-input and multiple-output (MIMO) telecommunications system having multiple-carrier transmitters transmitting a time/frequency frame including both data and pilots, each transmitter comprising:

a multi-carrier multiplexer module generating multi-carrier symbols; and a pilot modulator module for modulating pilots with multiple-state data modulation that is known to a receiver of the frames and for inserting the pilots as input to the multi-carrier multiplexer module;

the pilot modulator module is adapted to modulate at least some of the pilots distributed in the frame with states selected as a function of data that is not known to the receiver and of coding rules that are known to the receiver, the data being specific to a stream transmitted by the transmitter.

In a preferred implementation, the steps of the transmission or reception method of an embodiment of the invention are determined by the instructions of a transmission or reception program that is incorporated in an electronic circuit such as a chip, itself suitable for being placed in an electronic device such as a transmitter or a receiver. The transmission or reception method of an embodiment of the invention may equally well be implemented by a program that is loaded in a calculation member such as a processor or the equivalent, having its operation then controlled by executing the program.

Consequently, an embodiment of the invention also applies to a computer program, in particular a computer program in or on a data medium, and suitable for implementing an embodiment of the invention. The program may use any programming language, and may be in the form of source code, object code, or code intermediate between source code and object code such as in a partially compiled form, or in any other desirable form for implementing a method of an embodiment of the invention.

The data medium may be any entity or device capable of storing the program. For example, the medium may include storage means such as a read-only memory (ROM), e.g. a compact disk ROM (CD-ROM) or a microelectronic circuit ROM, or indeed magnetic recording means, e.g. a floppy disk, or a hard disk.

Alternatively, the data medium may be an integrated circuit incorporating the program, which circuit is adapted to execute or be used in the execution of the method in question.

The program may also be converted into a transmissible form such as an electrical or optical signal suitable for being conveyed via an electrical or optical cable, by radio, or by other means. The program of an embodiment of the invention may in particular be downloaded from a network of the Internet type.

BRIEF DESCRIPTION OF THE DRAWINGS

Other characteristics and advantages appear from the following description made with reference to the accompanying figures given by way of non-limiting examples.

DETAILED DESCRIPTION OF ILLUSTRATIVE EMBODIMENTS

Figure 4:
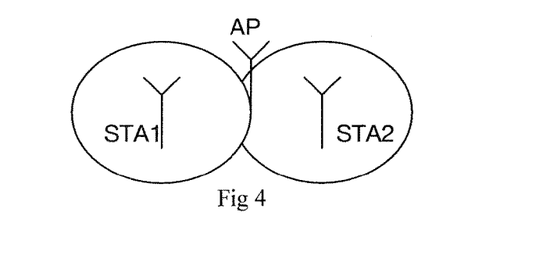
FIG. 4 is a diagram showing a basic service set (BSS) infrastructure of stations STA1, STA2 of a wireless radio system including an access point AP.

With reference to FIG. 4, a station STA1 accesses a wireless network by means of an access point AP.

The station STA1 is previously associated with the access point AP and possibly authenticated with said access point using known procedures.

The station STA1 transmits data that the access point transfers to a destination (not shown). With reference to FIG. 1, the data field PSDU is encapsulated in a frame TR PHY corresponding to the level 1 physical layer, which typically begins with a header PHY HDR and terminates with a tail field that serves to loop the lattice of the coding algorithm, followed by a pad field that serves to perform padding.

In the level 2 MAC layer, the data field PSDU of the physical frame corresponds to the so-called "MAC" frame. The MAC frame comprises a header MAC HRD, a data field MSDU, and a field FCS typically in accordance with the specifications of the physical layer convergence protocol (PLCP) convergence sublayer as set out in the MAC specifications of the 802.11x standard as described in the document 802.11-2007.

Figure 5:
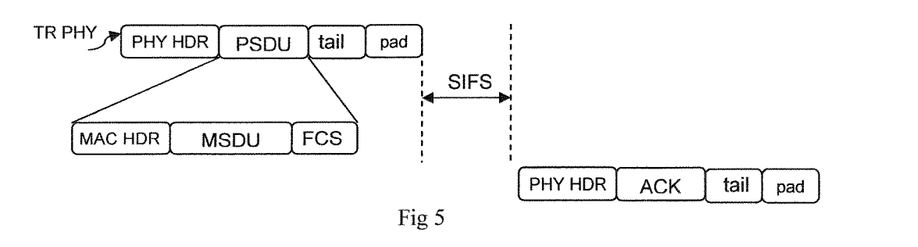
FIG. 5 is a diagrammatic representation of the acknowledgment of a frame using prior art techniques, and more particularly those described in the 802.11 standard.

According to techniques that are known and described more particularly in the 802.11 standard, the acknowledgment of a data frame is generated in the MAC layer of the receiver. The receiver acknowledges a frame when the field FCS is correct. The receiver waits for a short inter-frame space (SIFS) before it can transmit an acknowledgment frame, as shown in FIG. 5. When the field FCS is not correct, the receiver does not transmit the acknowledgment frame. In the absence of an acknowledgment message being returned on time-out of a counter that was triggered on transmitting the frame, the transmitter transmits a frame again.

Figure 6:
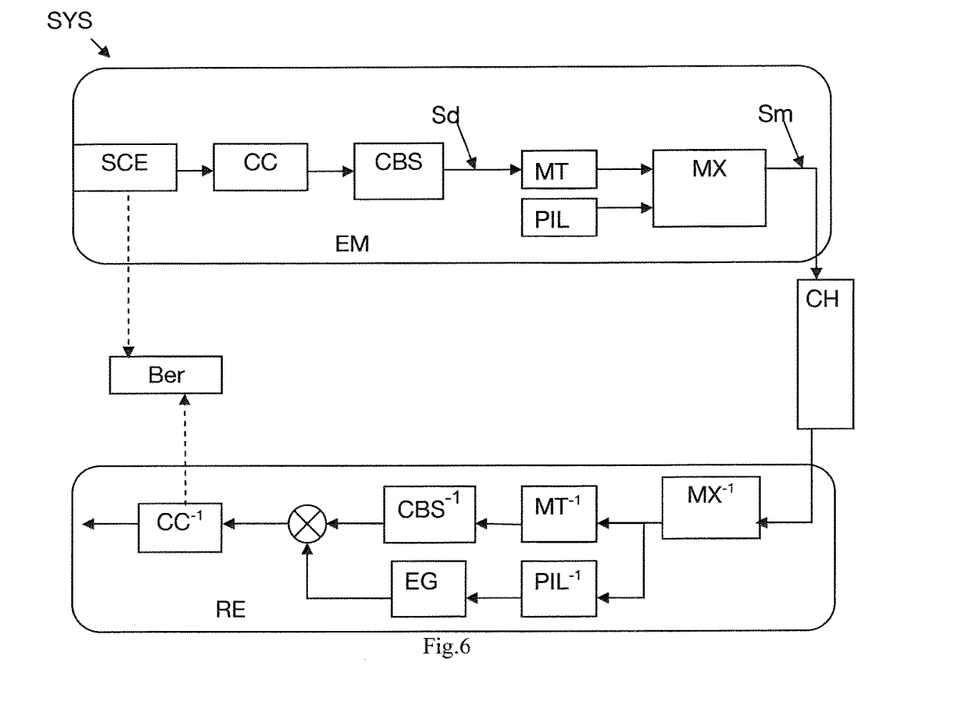
FIG. 6 is a block diagram of a telecommunications system.

In the level 1 physical layer, the processing corresponding to a physical frame is described with reference to FIG. 6. FIG. 6 is a block diagram of a telecommunications system.

The system is described in baseband, in association with the physical layer. The system comprises a transmitter EM and a receiver RE. The signal Sm transmitted by the transmitter is conveyed to the receiver by a transmission channel CH.

The transmission circuits of the transmitter comprise a coder CC, a modulator CBS, a framer module MT for building up frames, a module PIL for inserting pilots, and a multi-carrier multiplexing module MX also referred to as a multiplexer MX.

The input data to the transmission circuits are taken from an information source SCE. By way of example, the source corresponds to a speech signal, a data file, or video images. The coder CC adds redundancy to the input binary data, in particular to combat the distortions introduced by the propagation channel. The coded data is put into the form of data symbols by the modulator CBS. This signal transformation makes use of modulations such as BPSK, QPSK, 16 QAM, 64 QAM, etc. in order to obtain the data symbols. The data symbols are built up into a frame and mapped to the input of the multiplexer MX by the framer module MT. The module PIL transforms the pilots and inserts them into the frame mapped to the input of the multiplexer. In known manner, transforming pilots consists in generating a pseudo-random sequence by means of a pseudo-random generator and then in modulating the sequence, typically with BPSK modulation. The multiplexer MX transforms the data that is mapped on its inputs, typically by making use of an inverse Fourier transform so as to produce a multi-carrier symbol, e.g. of the OFDM type. The transmitted signal is constituted by multi-carrier symbols SM.

The transmission method thus inserts pilots on "pilot" subcarriers. The pilots generally the result of modulating a random or pseudo-random sequence that is known to the receiver using (±1) BPSK type modulation so as to avoid impacting the PAPR. The pilots serve on reception to estimate the phase rotations and the distortions that are generated by the frequency offsets of the local oscillators and by phase noise. The receiver can estimate the difference in the constellation between the received pilot and the position it ought to have, since the receiver knows the modulation and the pseudo-random sequence that were used on transmission, thereby enabling it to update its phase correction.

The reception circuits of the receiver RE comprise a multi-carrier demultiplexing module $MX^{-1}$, also referred to as a demultiplexer $MX^{-1}$, a de-framer module $MT^{-1}$, an equalizer EG, a pilot extractor module $PIL^{-1}$, a demodulator $CBS^{-1}$, and a decoder $CC^{-1}$. The multi-carrier demultiplexing module $MX^{-1}$ performs the inverse function to the multi-carrier multiplexing module MX. If the multiplexer performs an inverse Fourier transform, then conventionally the module $MX^{-1}$ performs a forward Fourier transform. The de-framer module $MT^{-1}$ performs the function that is the inverse to that of the framer module MT. The pilot extractor module $PIL^{-1}$ performs the function that is the inverse of the pilot inserter module PIL. Using the pilots, the equalizer module EG determines the coefficients of the transmission channel in order to correct the data concerning the distortion introduced by the channel. The demodulator $CBS^{-1}$ performs the function that is the inverse of the modulator CBS. The decoder $CC^{-1}$ performs the function that is the inverse of the coder CC.

Figure 7A:
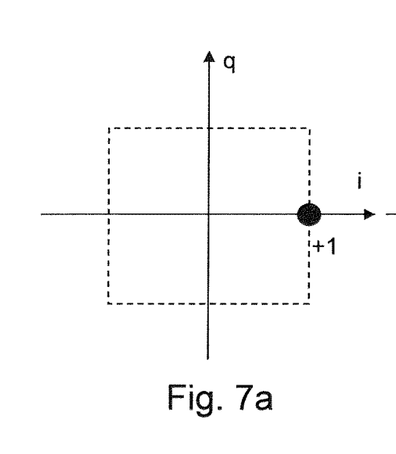
FIGS. 7a and 7b show a pilot modulated by BPSK respectively before transmission and after transmission.
Figure 7B:
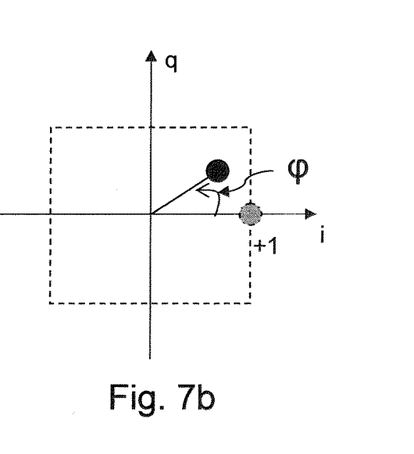

The example shown in FIGS. 7a-7b corresponds to BPSK modulation of the pilots on transmission. The first transmitted pilot corresponds to the value 1 of the pseudo-random generator and occupies the constellation position (+1,0) shown in FIG. 7a. The receiver knows that the received pilot should be a +1 since the receiver uses the same pseudo-random generator as is used on transmission, and consequently it knows that its position must be (+1,0). Nevertheless, as shown in FIG. 7b, the pilot as received occupies a position in the constellation in (i,q) space that is different from the expected position (+1,0) because of the distortions introduced by the channel. The difference between the two positions makes it simple to obtain an estimate of the phase error and possibly also of the amplitude error on the received pilot and thus to update the phase correction used during equalization.

Figure 8:
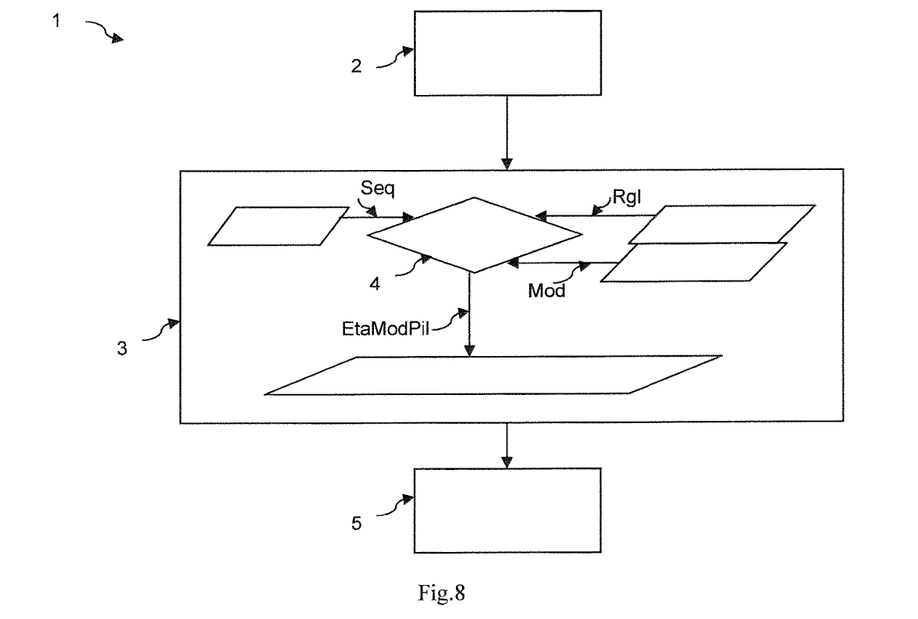
FIG. 8 is a flow chart of a method of transmitting time-frequency frames including both data and pilots transmitted by a multi-carrier transmitter of an embodiment of the invention.

FIG. 8 is a flow chart of a method of transmitting time/frequency frames including both data and pilots as transmitted by a multi-carrier transmitter of an embodiment of the invention. The transmission method 1 comprises the following steps:
 a step 2 of framing and mapping data symbols on the inputs of a multi-carrier multiplexer;
 a step 3 of transforming pilots using multiple-state data modulation Mod known to a receiver of the frames, the pilot modulation state EtaModPil being selected at 4 as a function of data Seq that is not known to the receiver and of coding rules Rgl that are known to the receiver; and
 a step 5 of inserting the pilots into the mapped frame.

Figures 9, 9A:
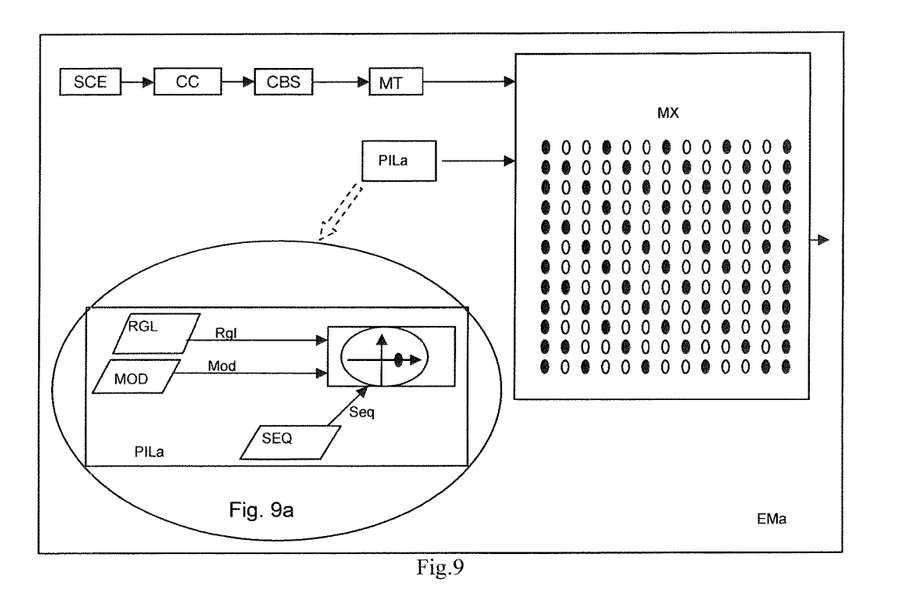
FIG. 9 is a block diagram of a transmitter EMa of an embodiment of the invention.
FIG. 9a is an enlarged detail view of the module PILa of the FIG. 9 transmitter.

FIG. 9 is a block diagram of a transmitter EMa of an embodiment of the invention. Compared with the prior art transmitter described with reference to FIG. 6, this transmitter is adapted in that it includes a pilot transformation and insertion module PILa that is adapted to implement a method of an embodiment of the invention. The module PILa is shown in the enlargement corresponding to FIG. 9a, and it implements the steps 3 and 5 of the transmission method shown in FIG. 8. In step 3 the module PILa transforms pilots using multistate modulation Mod, typically supplied by a modulation library module MOD, which modulation is known to a frame receiver. For a given pilot, the module PILa selects in step 4 the modulation state EtaModPil as a function of the value of data Seq that is not known to the receiver and that is supplied by a module SEQ and coding rules Rgl that are known to the receiver, and that are supplied by a module RGL. The module PILa inserts the transformed pilots into the frame that is mapped onto the inputs of the multiplexer MX.

In an embodiment, all of the pilots distributed in the time/frequency frame are transformed using this method by the module PILa.

In another embodiment, only some of the pilots distributed within the time/frequency frame are transformed using this method by the module PILa. Under such circumstances, the other distributed pilots are transformed by the module PILa using a known method, typically using a pseudo-random sequence that is known to the receiver.

In an embodiment, the module PILa also inserts one or more pilot symbols into the frame that have been transformed using known techniques, i.e. for which the receiver knows the pseudo-random sequence that was used on transmission. According to an embodiment of the invention, the transmission method 1 transmits over the pilot subcarriers an information sequence that is not known to the receiver, unlike the prior art in which the pseudo-random sequence is known on reception. In contrast, the receiver does know the modulation used for the unknown modulation sequence and it also knows the coding rule used on transmission for coding the information sequence. The modulation is generally BPSK, i.e. modulation having two states +1 and −1, however it could be some other form of modulation such as QPSK or 16 QAM.

FIGS. 10, 11a-11d show a reception method 10 of an embodiment of the invention.

Figure 10:
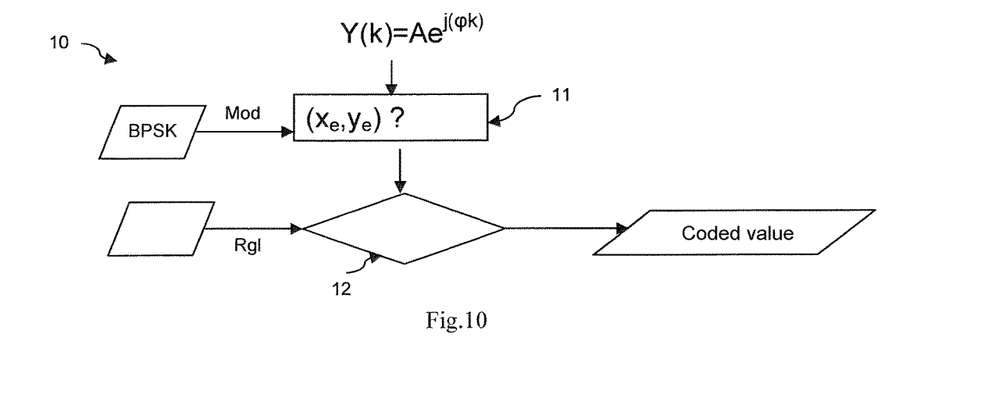
FIG. 10 is a flow chart of a reception method of an embodiment of the invention.

Starting from the received data Y(k) corresponding to a pilot, the receiver acts in a step 11 to determine the position $(x_e, y_e)$ corresponding to the transmitted pilot, knowing the possible states of the modulation Mod ((+1,0;); (−1,0) using BPSK modulation). In a step 12, the receiver determines the value coded by the pilot, knowing the coding rule Rgl used on transmission, and then it estimates the phase rotation and the distortion.

In an embodiment, the receiver takes the received pilot as equalized with the channel estimate calculated using the preambles and compares it with one or more thresholds or decision zones.

Figure 11A:
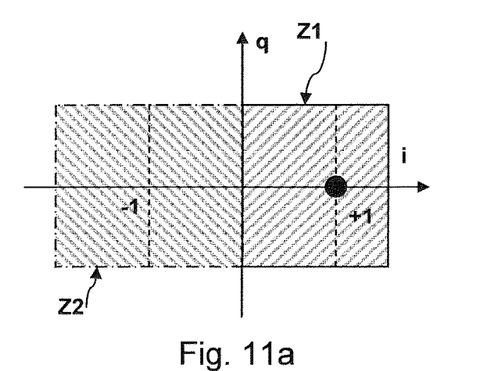
FIGS. 11a to 11d show a particular implementation of a reception method of an embodiment of the invention using BPSK modulation.
Figure 11B:
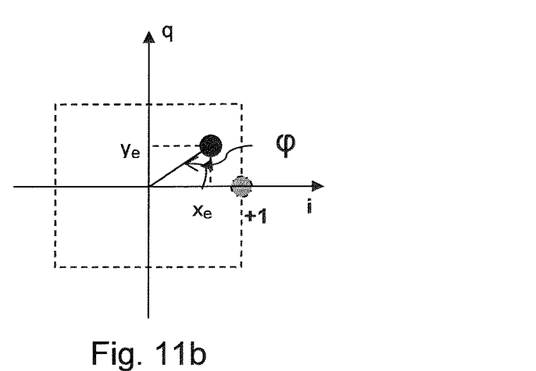
Figure 11C:
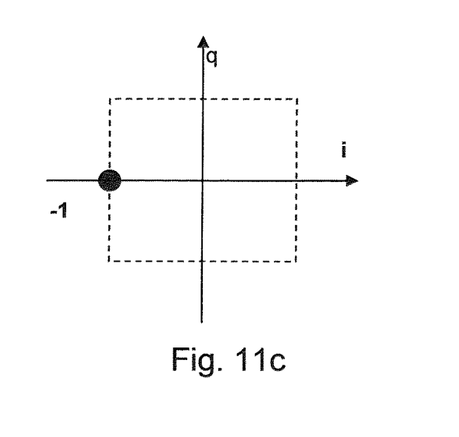

When BPSK modulation is used for the pilots on transmission, then as shown in FIG. 11a, the zones Z1 and Z2 may typically be defined by the axis, q, of the constellation. The zone Z1 corresponds to the range $]-\pi/2; +\pi/2[$ and the zone Z2 corresponds to the range $]+\pi/2; -\pi/2[$. Depending on these decision zones or thresholds, the method compares the received pilot phase with the range $]-\pi/2; +\pi/2[$ and with the range $]+\pi/2; -\pi/2[$. If the phase lies in the range $]-\pi/2; +\pi/2[$, then the transmitted pilot occupies the position (+1, 0), as shown in FIG. 11b. If the coding rule used on transmission associates the value one with the position (+1, 0) then the decoded value thus has the value +1. If the phase lies in the range $]+\pi/2; -\pi/2[$, then the transmitted pilot occupies the position (−1, 0), as shown in FIG. 11c. If the coding rule used on transmission associates the value zero with the position (−1, 0), then the decoded value thus has the value zero.

Figure 11D:
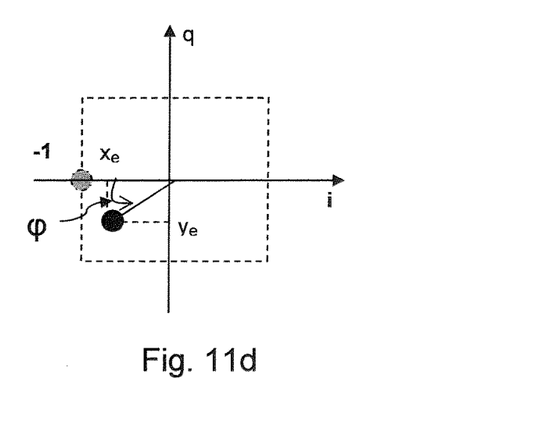

Thus, although the receiver does not know the position of the pilot on transmission, it can detect and identify that position because it knows the modulation that was used, and it can deduce therefrom the value that was encoded by the pilot, given that it knows the coding rule used on transmission. Knowing the position of the constellation on transmission, the method uses known techniques to estimate the phase rotation and the distortion on the position of the received pilot, as shown in FIGS. 11b and 11d.

Whatever the constellation, the decision zones are disjoint, and each of them contains only one state. For QPSK, there are four zones that are typically defined by the axes, i and q, of the constellation.

When the phase rotation and the distortion on the position of the received pilot are small compared with the boundaries of the decision zone, then the transmitter can decide to change modulation for the pilot and select modulation having a larger number of states. The choice of modulation must be such that each of the decision zones on reception encompasses the position of the pilot as transmitted and the position of the corresponding pilot as received, i.e. in spite of any phase rotation and distortion introduced by the channel, the received pilot should remain in the decision zone that surrounds the position of the transmitted pilot.

If phase rotation is large, it is then preferable not to use all of the pilot carriers of an OFDM symbol when transmitting information in accordance with an embodiment of the invention and to conserve some of these subcarriers essentially for estimating the phase shift and the amplitude. Under such conditions, differential modulation may be used for coding the information.

In an embodiment, a method of the invention advantageously makes it possible to anticipate the detection of a frame transmission error compared with the technique described above with reference to FIG. 5.

In this embodiment, the data coded by the pilots conveys transmission error coding information. When the coded data associated with a pilot codes an error, then the receiver can send a frame error message to the transmitter of the frame.

The time/frequency frame may have only one pilot per multi-carrier symbol. The pilot then encodes the parity of the multi-carrier symbol, for example. With BPSK modulation, the pilots code a parity bit, for example. Consider a telecommunications system configured with 52 carriers and BPSK modulation associated with a coder having an efficiency of ½. The 52 data carriers enable 26 data bits from the source SCE to be coded by an OFDM symbol. BPSK modulation is also selected to modulate a pilot carrier that, in accordance with an embodiment of the invention, codes, on a single bit, a parity calculated on the 26 data bits.

If there are several carriers in a single multi-carrier symbol, then in an embodiment, it is not necessary for all of the pilots to be used by the invention, and each of the other pilots may be dedicated to coding the parity of a stream. Under such circumstances, conventional coherent modulation may be used, but differential modulation can also be used (DBPSK, DQPSK, Q16QAM, D64QAM).

If there are several pilots in a single multi-carrier symbol, then in another embodiment, each pilot may be dedicated to coding the parity of a stream. Under such circumstances, if the distortions to which the pilots are subjected are phase shifts only, then amplitude modulation on a single axis may be used to perform amplitude shift keying (ASK). Otherwise, conventional coherent modulation may be used.

Consider a MIMO telecommunications system configured with 52 carriers and BPSK modulation associated with a coder having efficiency of ½. The 52 data carriers serve to code 26 data bits from the source SCE in an OFDM symbol. BPSK modulation is also selected for modulating a pilot carrier that, in accordance with an embodiment of the invention, encodes, on one bit, a parity calculated on the 26 data bits. The pilot subcarriers −21, −7, 7, and 21 serve to code parity on one bit for up to four space streams (MIMO 4×4): the −21 pilot carrier codes the parity of stream No. 1, the −7 pilot carrier codes the parity of stream No. 2, the 7 pilot carrier codes the parity of stream No. 3, and the 21 pilot carrier codes the parity of stream No. 4. The values of the pilots are given in Table 1 in Appendix 1. The coding rule is as follows: the value zero corresponds to modulation state (1,0) and the value one corresponds to the modulation state (−1,0).

Consider a MIMO telecommunications system configured with 52 carriers and 64 QAM modulation associated with a coder having efficiency of ⅚. The 52 data carriers serve to code 260 data bits from the source SCE in an OFDM symbol. QPSK modulation is selected to modulate a pilot carrier that, in accordance with an embodiment of the invention, encodes a 2-bit checksum calculated on the 260 data bits. The pilot subcarriers −21, −7, 7, and 21 serve to code a 2-bit checksum for up to four space streams (MIMO, 4×4): the −21 pilot carrier codes the checksum of the stream No. 1, the −7 pilot carrier codes the checksum of the stream No. 2, the 7 pilot carrier codes the checksum of the stream No. 3, and the 21 pilot carrier codes the checksum of the stream No. 4. The values of the pilots are given in Table 2 in Appendix 1. The coding rule is as follows: the value (00) corresponds to modulation state (1,0), the value (01) corresponds to the modulation state (1,+j), the value (10) corresponds to the modulation state (−1, 0), and the value (11) corresponds to the modulation state (−1,−j).

In another embodiment, if there are several pilots in a single multi-carrier symbol, then the pilots taken together can code the result of the checksum calculated over all of the space streams of the OFDM symbol. In another embodiment, if there are several pilots in a single multi-carrier symbol, then the result of the checksum calculated over all of the space streams of the OFDM symbol may be duplicated on each pilot carrier in order to increase the robustness with which the information coded by the pilots is detected.

Figure 12:
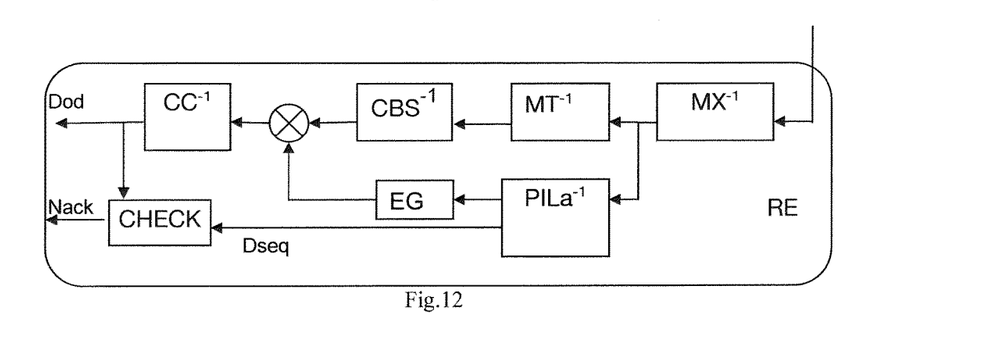
FIG. 12 is a block diagram of an example of a receiver adapted to detect a frame transmission error earlier than in the prior art.

Thus, the receiver compares the parity of the received data with the parity coded by the pilots. FIG. 12 is a block diagram of an example of a receiver adapted to anticipate detecting a frame transmission error compared with the prior art.

Compared with the prior art receiver shown in FIG. 6, this receiver further includes a module $PILa^{-1}$ for implementing a reception method as illustrated in FIGS. 10, 11a-11d. The receiver also includes a module CHECK. This module compares the data Dseq as decoded by the module $PILa^{-1}$ with the checksum value calculated on the decoded data Dod from the decoder $CC^{-1}$, which data Dod corresponds to the decoded sequence Dseq. By way of example, the decoded data Dod compared by the module CHECK with the data Dseq corresponds to an OFDM symbol, and the decoded sequence Dseq corresponds to the parity of the OFDM symbol. When they are not equal, the receiver deduces that there has been a transmission error, and consequently it may transmit a Nack message in return to the transmitter informing it of a transmission error.

The error return message may consist in a PLCP frame that may be sent to the transmitter of the frame in a manner that is anticipated compared with the known techniques that require the field FCS to be decoded at in the level 2 layer. Implementing this technique serves to optimize the efficiency of the MAC layer since the transmitter can stop transmitting an erroneous frame more quickly than is possible using the techniques of the prior art. Instead of detecting non-reception of an acknowledgment message ACK, a PLCP frame indicates explicitly that there has been a transmission error and makes it possible to perform retransmission quickly (in the same TXOP for voice or video queues).

The improvement may be estimated using the following assumptions: 10% of packets are erroneous, mean packet size 1000 bytes, error detected in the middle of a packet (at byte 500). For MCS0 modulation, the improvement is about 350 microseconds (μs) once every 15 milliseconds (ms), giving an improvement of 2.5%. With MCS7 modulation, the improvement is about 50 μs once every 3.5 ms, i.e. an improvement of 1.4%.

TABLE 1

APPENDIX 1

| NSS | OFDM data symbol parity | Pilot −21 | Pilot −7 | Pilot 7 | Pilot 21 |
|---|---|---|---|---|---|
| Stream 1 | 0 | (1, 0) | (1, 0) | (1, 0) | (1, 0) |
|  | 1 | (−1, 0) | (1, 0) | (1, 0) | (1, 0) |
| Stream 2 | 0 | (1, 0) | (1, 0) | (1, 0) | (1, 0) |
|  | 1 | (1, 0) | (−1, 0) | (1, 0) | (1, 0) |
| Stream 3 | 0 | (1, 0) | (1, 0) | (1, 0) | (1, 0) |
|  | 1 | (1, 0) | (1, 0) | (−1, 0) | (1, 0) |
| Stream 4 | 0 | (1, 0) | (1, 0) | (1, 0) | (1, 0) |
|  | 1 | (1, 0) | (1, 0) | (1, 0) | (−1, 0) |

TABLE 2

| NSS | OFDM data symbol parity | Pilot −21 | Pilot −7 | Pilot 7 | Pilot 21 |
|---|---|---|---|---|---|
| Stream 1 | 00 | (1, 0) | (1, 0) | (1, 0) | (1, 0) |
|  | 01 | (1, +j) | (1, 0) | (1, 0) | (1, 0) |
|  | 10 | (−1, 0) | (1, 0) | (1, 0) | (1, 0) |
|  | 11 | (−1, −j) | (1, 0) | (1, 0) | (1, 0) |
| Stream 2 | 00 | (1, 0) | (1, 0) | (1, 0) | (1, 0) |
|  | 01 | (1, 0) | (1, +j) | (1, 0) | (1, 0) |
|  | 10 | (1, 0) | (−1, 0) | (1, 0) | (1, 0) |
|  | 11 | (1, 0) | (−1, −j) | (1, 0) | (1, 0) |
| Stream 3 | 00 | (1, 0) | (1, 0) | (1, 0) | (1, 0) |
|  | 01 | (1, 0) | (1, 0) | (1, +j) | (1, 0) |
|  | 10 | (1, 0) | (1, 0) | (−1, 0) | (1, 0) |
|  | 11 | (1, 0) | (1, 0) | (−1, −j) | (1, 0) |
| Stream 4 | 00 | (1, 0) | (1, 0) | (1, 0) | (1, 0) |
|  | 01 | (1, 0) | (1, 0) | (1, 0) | (1, +j) |
|  | 10 | (1, 0) | (1, 0) | (1, 0) | (−1, 0) |
|  | 11 | (1, 0) | (1, 0) | (1, 0) | (−1, −j) |

Although the present disclosure has been described with reference to one or more examples, workers skilled in the art will recognize that changes may be made in form and detail without departing from the scope of the disclosure and/or the appended claims.

The invention claimed is:

1. A method of transmitting a physical frame, which is a time/frequency frame including both data and distributed pilots, to a receiver, the method comprising:
    coding coded source data into data symbols;
    framing the data symbols into a frame and mapping the frame to an input of a multi-carrier multiplexer;
    the multi-carrier multiplexer generating multi-carrier symbols whose succession forms the time/frequency frame;
    modulating pilots using $2^n$-state data modulation that is known to the receiver of the physical frame and selecting a modulation state for each of these pilots as a function of a pseudo random sequence known to the receiver,
    coding other pilots
        by selecting a modulation state of the $2^n$-state data modulation for each of n bits that are not known to the receiver and that at least comprise parity bits on data of the physical frame and as a function of coding rules that are known to the receiver and that make a one to one correspondence between the $2^n$ modulation states and $2^n$ combinations of n bits and
        by mapping each of these other pilots on this selected modulation state of the $2^n$-state of the data modulation;
    inserting the modulated pilots and the coding pilots in a distributed manner into the mapped frame for transmission channel estimation and for transmission error detection in the physical frame;
    transmitting the physical frame to the receiver; and
    retransmitting the physical frame to the receiver on reception of a frame error message from the receiver detecting transmission error by decoding the parity bits recovered by decoding the coded pilots of the physical frame.

2. The method of transmitting a physical frame to a receiver according to claim 1, wherein at least some of the n bits not known to the receiver corresponds to data making it possible to improve a quality of service of streams exchanged between the transmitter device and the receiver and/or between the receiver and the transmitter device.

3. A multi-carrier transmitter for transmitting a physical frame, which is a time/frequency frame including both data and distributed pilots, to a receiver, the transmitter comprising:
    a data modulator, which generates data symbols from coded source data;
    a data framer, which frames the data symbols into a frame and maps the frame to the input of a multi-carrier multiplexer module as a mapped frame;
    the multi-carrier multiplexer module being configured to generate multi-carrier symbols whose succession forms the time/frequency frame;
    and
    a pilot modulator module, which modulates pilots with $2^n$-state data modulation known to the receiver by selecting a modulation state for each of these pilots as a function of a pseudo random sequence,
    wherein the pilot modulator module codes other pilots by selecting a modulation state of the $2^n$-state data modulation for each of n bits that are not known to the receiver and that at least comprise parity bits on data of the physical frame and as a function of coding rules that are known to the receiver and that make a one to one correspondence between the $2^n$ modulation states and $2^n$ combinations of n bits, and by mapping each of these other pilots on this selected modulation state of the $2^n$-state of the data modulation;
    wherein the pilot modulator module inserts the modulated pilots and the coding pilots in a distributed manner into the mapped frame as inputs to the multi-carrier multiplexer module for transmission channel estimation and for transmission error detection in the physical frame and
    the transmitter being configured to transmit the physical frame; and
    the transmitter being configured to retransmit the physical frame on reception of a frame error message from the receiver detecting transmission error by decoding the parity bits recovered by decoding the coded pilots of the physical frame.

4. A method comprising:
    receiving by a receiver device a physical frame which is a time/frequency frame including both data and distributed pilots which include modulating pilots and coding pilots, the distributed pilots being for transmission channel estimation by the receiver, the coding pilots being further for transmission error detection in the physical frame, the coding pilots coding data that is not known to the receiver and that corresponds to n parity bits on data of the physical frame, wherein receiving comprises acts of:

comparing with the receiver device a position in a real and imaginary space of a coding pilot with possible $2^n$ coded pilot positions in order to deduce therefrom a position of the coding pilot as transmitted, knowing a $2^n$-state data modulation used on transmission;

on the basis of the position of the coding pilot as transmitted, the receiver device determining the n parity bits coded by said coding pilot, knowing coding rules used on transmission that make a one to one correspondence between the $2^n$ modulation states and $2^n$ combinations of n bits; and generating a frame error message on detection of a transmission error when decoding the determined n parity bits.

5. A receiver for receiving a physical frame which is a time/frequency frame including both data and distributed pilots which include modulating pilots and coding pilots, the distributed pilots being for transmission channel estimation by the receiver and the coding pilots being further for transmission error detection in the physical frame, the coding pilots coding data that is not known to the receiver and that corresponds to n parity bits on data of the physical frame, the receiver comprising:

a comparator configured to compare a position in a real and imaginary space of a coding pilot with $2^n$ possible coded pilot positions and deducing therefrom a position of the coding pilot as transmitted, knowing a $2^n$-state data modulation used on transmission, and determining the n parity bits coded by said coding pilot from the position of the coding pilot as transmitted, knowing coding rules used on transmission that make a one to one correspondence between the $2^n$ modulation states and $2^n$ combinations of n bits; and a decoder configured to decode the n determined parity bits; and the receiver is configured to generate a frame error message when the determined n parity bits codes an error.

6. A telecommunications system comprising:
a receiver; and
a multi-carrier transmitter of a physical frame, which is a time/frequency frame including both data and distributed pilots, to the receiver, the transmitter comprising:
    a data modulator, which generates data symbols from coded source data;
    a data framer, which frames the data symbols into a frame and maps the frame to the input of a multi-carrier multiplexer module;
    the multi-carrier multiplexer module, which generates multi-carrier symbols whose succession forms the time/frequency frame; and
    a pilot modulator module, which modulates pilots with $2^n$-state data modulation known to the receiver by selecting a modulation state for each of these pilots as a function of a pseudo random sequence,
    wherein the pilot modulator module codes other pilots by selecting a modulation state of the $2^n$-state data modulation for each of n bits that are not known to the receiver and that at least comprise parity information on data of the physical frame and as a function of coding rules that are known to the receiver and that make a one to one correspondence between the $2^n$ modulation states and $2^n$ combinations of n bits, and by mapping each of these other pilots on the selected modulation state of the $2^n$-state of the data modulation;
    wherein the pilot modulator inserts the modulated pilots and the coding pilots in a distributed manner into the mapped frame as inputs to the multi-carrier multiplexer module for transmission channel estimation and for transmission error detection in the physical frame and
wherein the receiver comprises:
    a comparator configured to compare a position in an in-phase and quadrature space of a received coding pilot with $2^n$ possible coded pilot positions and deducing therefrom a position of the coding pilot as transmitted, knowing the $2^n$-state data modulation used on transmission, determining the n parity bits coded by said coding pilot from the position of the coding pilot as transmitted, knowing the coding rules used on transmission that make a one to one correspondence between the $2^n$ modulation states and $2^n$ combinations of n bits; and
    a decoder configured to decode the n determined parity bits; and
    the receiver being configured to generate a frame error message when the determined n parity bits codes an error; and
    the transmitter being configured to retransmit the physical frame to the receiver on reception of the frame error message from the receiver.

7. A MIMO telecommunications system including multi-carrier transmitters transmitting a physical frame which is a time/frequency frame including both data and distributed pilots, each transmitter comprising:
    a data modulator, which generates data symbols from coded source data;
    a data framer, which frames the data symbols into a frame and maps the frame to the input of a multi-carrier multiplexer as a mapped frame;
    the multi-carrier multiplexer being configured to generate multi-carrier symbols whose succession forms the time/frequency frame; and
    a pilot modulator module, which modulates pilots with $2^n$-state data modulation that is known to a receiver of the physical frame by selecting a modulation state for each of these pilots as a function of a pseudo random sequence,
    wherein the pilot modulator module codes other pilots by selecting a modulation state of the $2^n$-state data modulation for each of n bits that are not known to the receiver and that at least comprise parity bits on data of the physical frame and of coding rules that are known to the receiver and that make a one to one correspondence between the $2^n$ modulation states and $2^n$ combinations of n bits, the n bits being specific to a stream transmitted by the transmitter and by mapping each of these other pilots on the selected modulation state of the $2^n$-state of the data modulation,
    wherein the pilot modulator inserts the modulated pilots and the coding pilots in a distributed manner into the mapped frame as inputs to the multi-carrier multiplexer module for transmission channel estimation and for transmission error detection in the physical frame;

the transmitter being configured to transmit the physical frame to the receiver; and the transmitter being configured to retransmit the physical frame to the receiver on reception of a frame error message from the receiver detecting transmission error by decoding the parity bits recovered by decoding the coded pilots of the physical frame.

8. A computer program on a non-transitory data medium, said program including program instructions adapted to implementing a method of transmitting a physical frame, which is a time/frequency frame including both data and distributed pilots, when said program is loaded in and executed by a transmitter, wherein the method comprises:

coding coded source data into data symbols;

framing the data symbols into a frame and mapping the frame to an input of a multi-carrier multiplexer;

the multi-carrier multiplexer generating multi-carrier symbols whose succession forms the time/frequency frame;

modulating pilots using $2^n$-state data modulation that is known to a receiver of the physical frame and selecting a modulation state for each of these pilots as a function of a pseudo random sequence, coding other pilots by selecting a modulation state of the $2^n$-state data modulation for each of n bits that are not known to the receiver and that at least comprise parity bits on data of the physical frame and as a function of coding rules that are known to the receiver and that make a one to one correspondence between the $2^n$ modulation states and $2^n$ combinations of n bits and by mapping each of these other pilots on the selected modulation state of the $2^n$-state of the data modulation;

inserting the modulated pilots and the coding pilots in a distributed manner into the mapped frame for transmission channel estimation and for transmission error detection in the physical frame;

transmitting the physical frame to the receiver; and retransmitting the physical frame to the receiver on reception of a frame error message from the receiver detecting transmission error by decoding the parity bits recovered by decoding the coded pilots of the physical frame.

* * * * *